(12) United States Patent
Govindassamy (10) Patent No.: US 9,942,815 B1
(45) Date of Patent: Apr. 10, 2018

(54) METHOD AND APPARATUS FOR LOCATION DETERMINATION OF A BASE STATION AT A CLIENT DEVICE

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/407,647

(22) Filed: Jan. 17, 2017

(51) Int. Cl.
| | | |
|---|---|---|
| H04W 24/00 | (2009.01) |
| H04W 36/08 | (2009.01) |
| H04W 64/00 | (2009.01) |
| H04W 56/00 | (2009.01) |
| H04B 17/318 | (2015.01) |
| H04L 12/26 | (2006.01) |

(52) U.S. Cl.
CPC .......... *H04W 36/08* (2013.01); *H04B 17/318* (2015.01); *H04L 43/0829* (2013.01); *H04W 56/004* (2013.01); *H04W 64/003* (2013.01)

(58) Field of Classification Search
CPC .......... G01S 19/48; G01S 5/0221; G01S 5/12; G06Q 20/3829; H04W 4/028; H04W 4/02; H04W 4/20; H04W 64/00; H04W 4/021; H04L 67/18; H04L 63/18
See application file for complete search history.

(56) References Cited

U.S. PATENT DOCUMENTS

2013/0316727 A1* 11/2013 Edge ............... H04W 4/02
455/456.1
2014/0056220 A1* 2/2014 Poitau ............. H04W 40/246
370/328

OTHER PUBLICATIONS

Thomas et al., Revisiting Trilateration for Robot Localization, IEEE Transactions in Robotics, vol. 21, No. 1., pp. 93-101, Feb. 2005.
Digital Mobile Radio Towards Future Generations Systems, Cost 231 Final Report, Chapter 4, pp. 134-140, European Communities, Belgium, 1999.

\* cited by examiner

*Primary Examiner* — Idowu O Osifade
(74) *Attorney, Agent, or Firm* — Lerner, David, Littenberg, Krumholz & Menlik, LLP (57) ABSTRACT

In some scenarios it may be useful for a client terminal to know the location of one or more base stations in a wireless communication network. While a network may know its location accurately, it may not provide that information to a client terminal. Furthermore, the location information for a base station may be required before a client terminal can communicate with a particular base station. Location determination is a commonly available and used capability in many client terminals in a wireless communication network for finding the client terminal's own location. A method and apparatus are disclosed that enable a client terminal that is capable of determining its own location to be able to determine the location of any base station in a wireless communication network. A client terminal may use the base station location information for improved performance, improved user experience, and reduced power consumption.

40 Claims, 9 Drawing Sheets

Coverage boundary of
a cell served by $BS_A$

METHOD AND APPARATUS FOR LOCATION DETERMINATION OF A BASE STATION AT A CLIENT DEVICE

BACKGROUND

Figure 1:
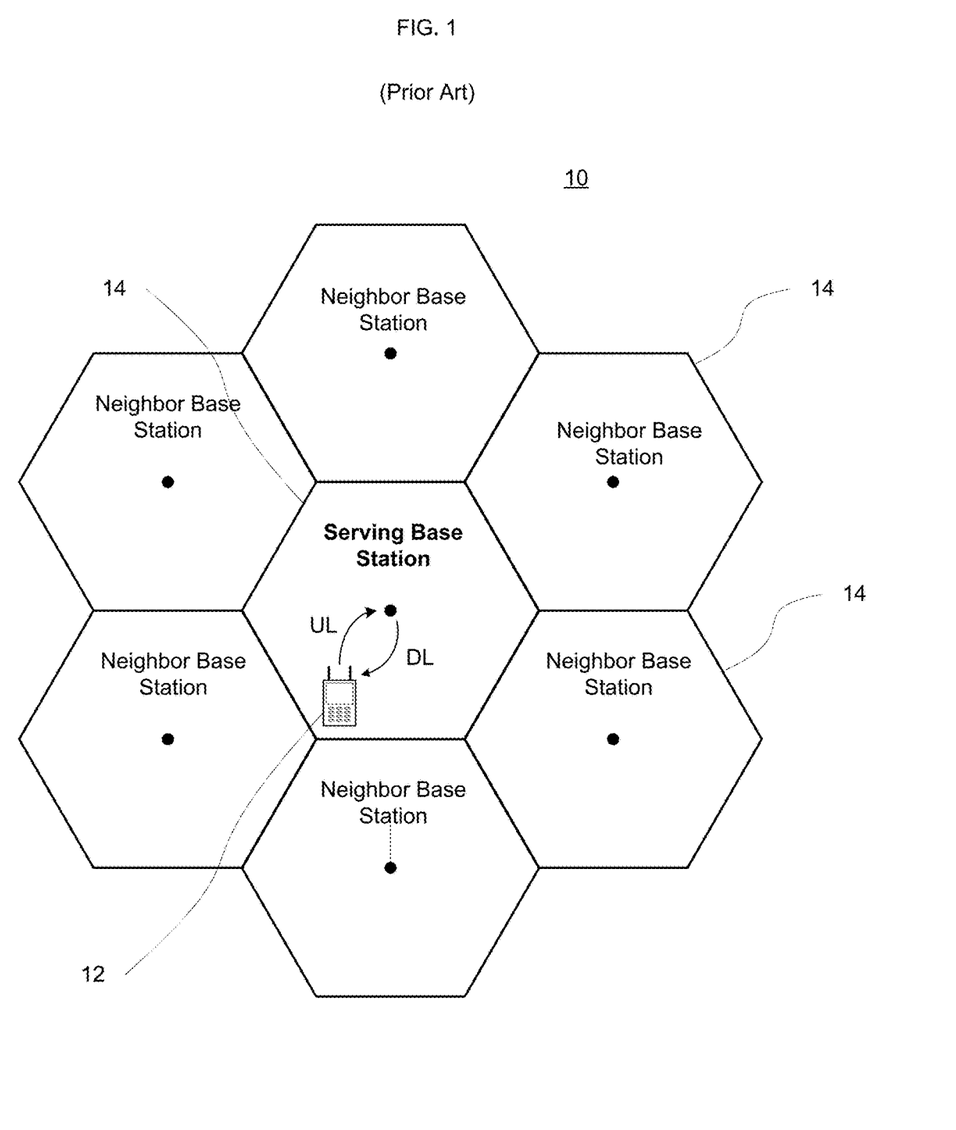
FIG. 1 illustrates a conventional mobile wireless communication system.

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. The terms base station and a cell may be used interchangeably herein. A cell from which a client terminal has already received service may be referred to as having visited that cell. In general, the cells that are in the vicinity of the serving cell are called neighbor cells. Similarly, in some wireless communication systems a neighbor base station is normally referred to as a neighbor cell. Each base station may be identified by a unique identifier referred to herein as Cell Identity (CID). The CID of a base station may be known to a client terminal when it decodes broadcast information from the base station. The CID may be of different types such as Cell Global Identity (CGI) in case of $3^{rd}$ Generation Partnership Project (3GPP) Long Term Evolution (LTE) wireless communication system. A base station may have additional identities such as Closed Subscriber Group (CSG) identity. Furthermore, there may be an identity for the entire network to uniquely identify a particular network operator. For example, in case of 3GPP LTE wireless communication system, a Public Land Mobile Network (PLMN) identity may be used. The various identities used by a cell and the network may be broadcast by the cell as system information.

Figure 2:
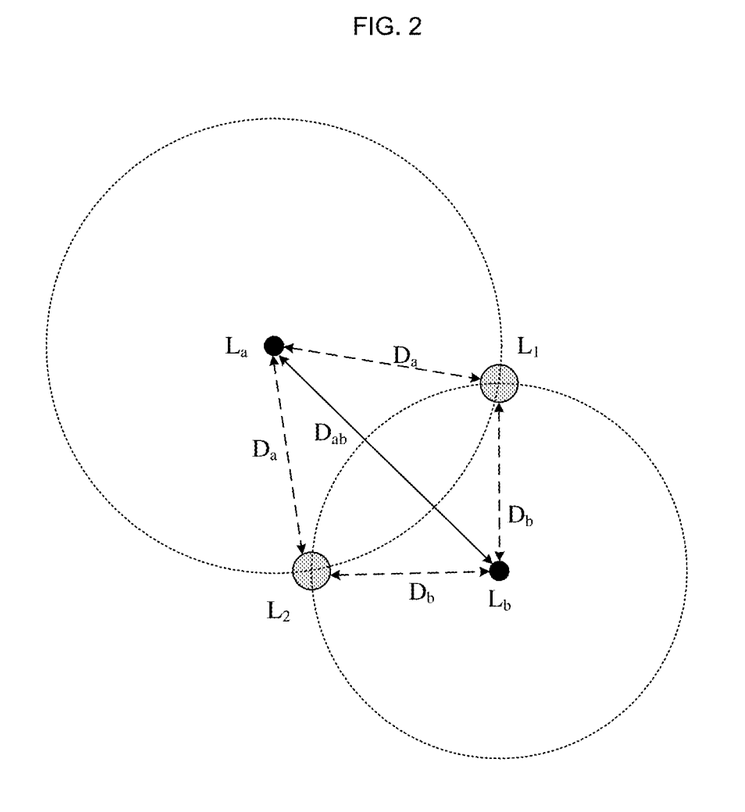
FIG. 2 illustrates an example use of the trilateration method using two known points and two distances.
Figure 3:
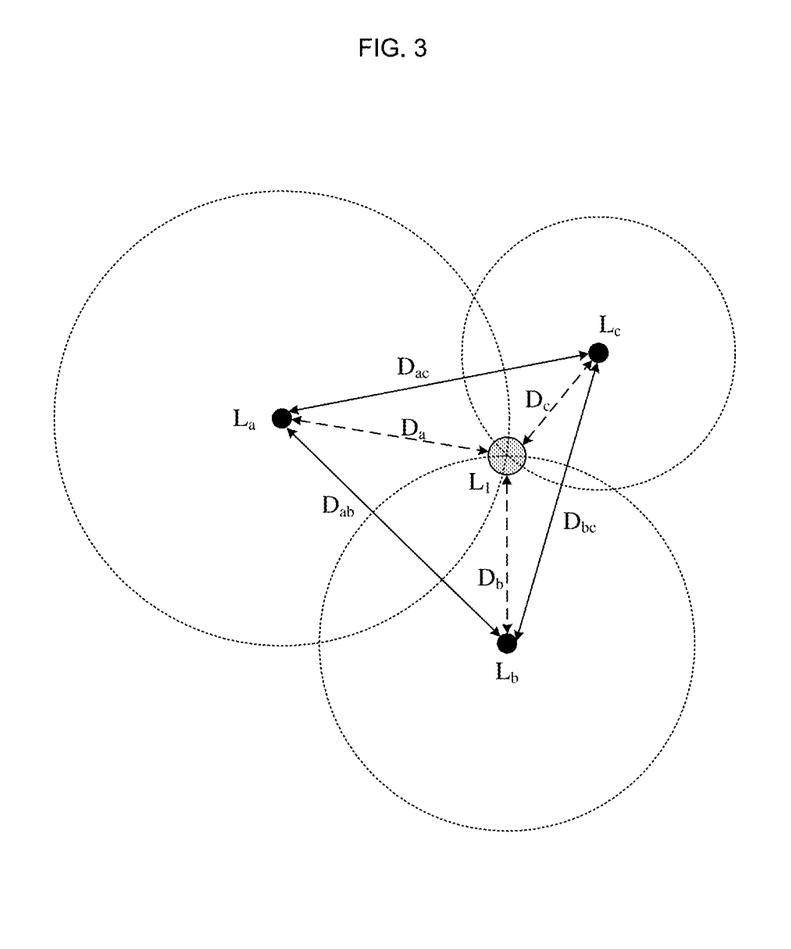
FIG. 3 illustrates an example use of the trilateration method using three known points and two distances.

Location determination is a commonly available and used capability in many client terminals in a wireless communication system. The terms location determination and positioning are used interchangeably herein. Client terminals may obtain their own location through different technologies. A satellite navigation system with global coverage commonly known as Global Navigation Satellite System (GNSS) and the Observed Time Difference of Arrival (OT-DOA) are two example technologies. Although there may be many different technologies for location determination, often the core methods used for location determination are triangulation and trilateration. Triangulation is a method of determining the location of a point by measuring angles to it from known points. The point can then be fixed as the third point of a triangle with one known side and two known angles. Trilateration is the process of determining absolute or relative locations of points by measurement of distances. In two-dimensional geometry, it is known that if a point lies on two circles corresponding to the known distances from known points, then the circle centers and the two radii (distances) provide sufficient information to narrow the possible locations down to two as shown in FIG. 2. In FIG. 2, there are two known locations $L_a$ and $L_b$. The distance $D_{ab}$ between these two locations is also known based on the known locations $L_a$ and $L_b$. The two locations $L_1$ and $L_2$ are equidistance from each of the two known points $L_a$ and $L_b$. If the distances $D_a$ and $D_b$ are known, it is still not possible to uniquely determine whether the true location is $L_1$ or $L_2$. Additional information, such as third known point with known distance to it, may narrow the possibilities down to one unique location as shown in FIG. 3. The third location $L_c$ and its distance $D_{ac}$ between the locations $L_a$ and $L_c$ and its distance $D_{bc}$ between the locations $L_b$ and $L_c$ may be known based on known location of $L_c$. Furthermore, the distance $D_c$ from the location $L_c$ to location $L_1$ may be known. Using these three sets of information, the coordinates of the location $L_1$ can be uniquely determined using conventional trilateration calculations, for example, as described in "Revisiting Trilateration for Robot Localization", by Federico Thomas and Lluís Ros, IEEE Transactions in Robotics, February 2005, pgs 93-101, incorporated by reference herein.

Figure 4:
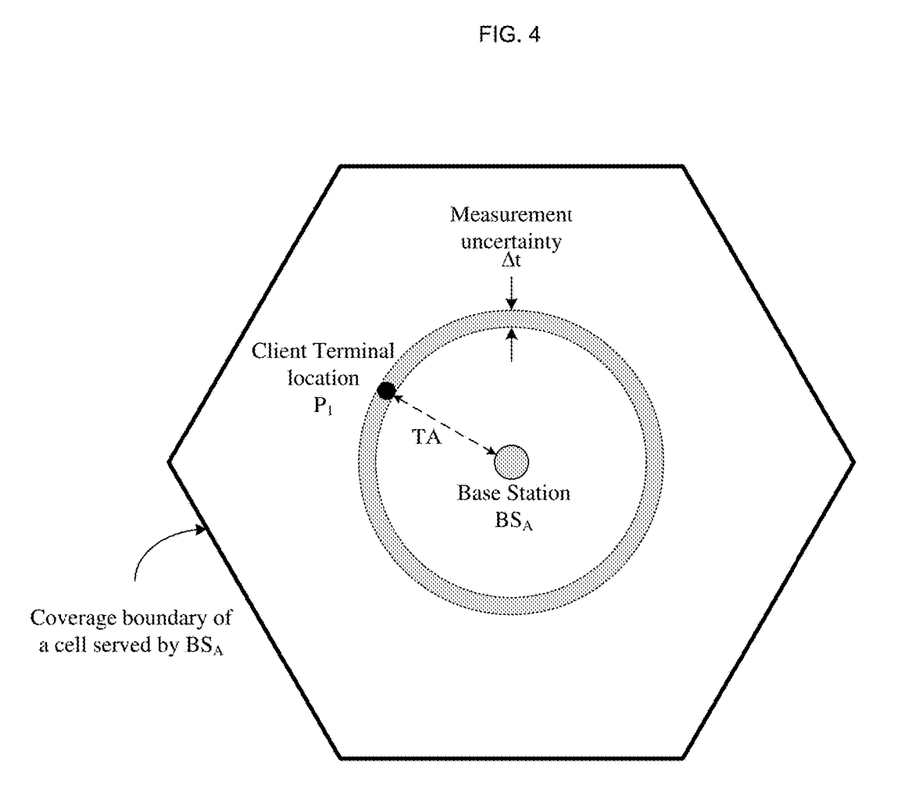
FIG. 4 illustrates an example distance estimation based on Timing Advance in a wireless communication system.
Figure 5:
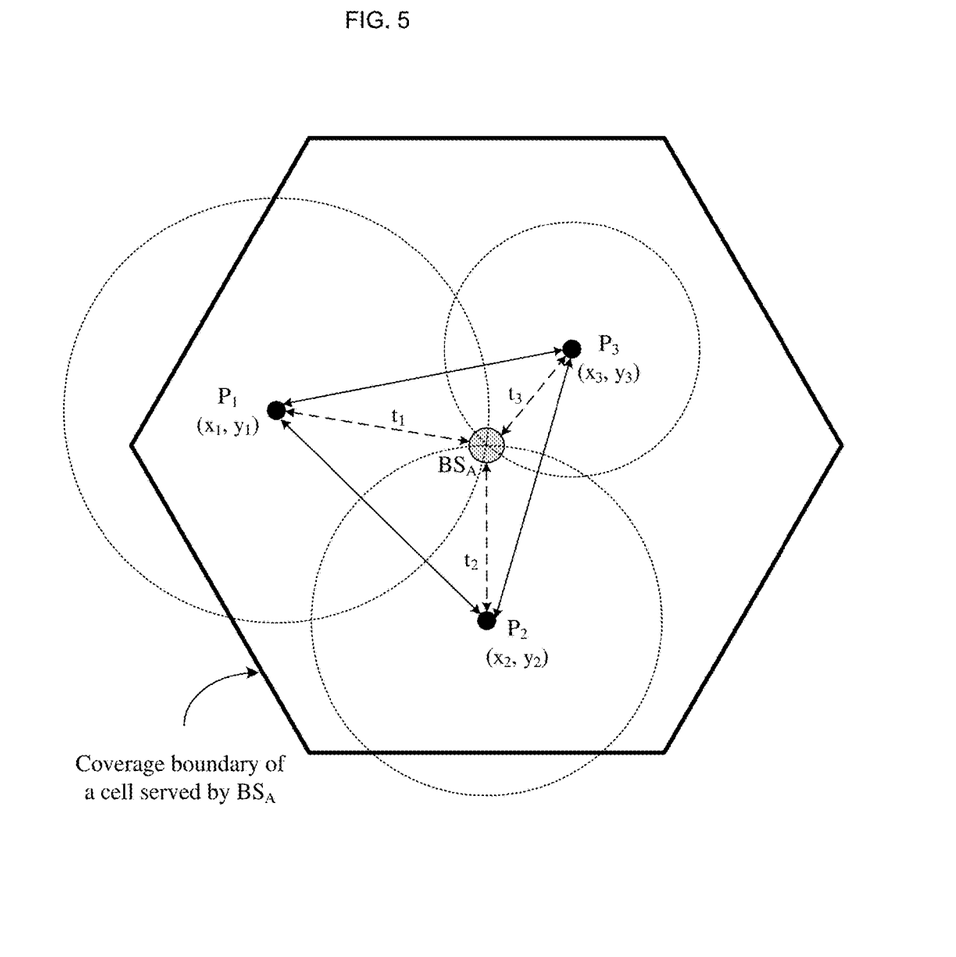
FIG. 5 illustrates an example base station location determination by a client terminal in a wireless communication system according to the aspects of the present disclosure.

Location information may be obtained using other information about a cell in a wireless communication network. For example, the Round Trip Delay (RTD) or Timing Advance (TA) between a base station and a client terminal, the Received Signal Strength Indicator (RSSI), etc., combined with the known location of a cell may be used to determine the location of a client terminal. For example, the TA may be used to estimate the distance of a client terminal from the serving cell. This can narrow the location of a client terminal to a circular band of radius corresponding the distance based on TA as illustrated in FIG. 4. The timing advance typically corresponds to twice the propagation delay for a Radio Frequency (RF) signal to travel from a base station $BS_A$ to a client terminal. The TA is typically estimated by a base station when a client terminal performs initial uplink transmissions. The approximate distance between a client terminal and the $BS_A$ may be obtained by dividing half of TA by the speed of light. As illustrated in FIG. 4, there may be some uncertainty Δt in the measured value of the TA. This uncertainty may lead to uncertainty in the estimated distance using the TA. Multiple TA measurements may be used to reduce uncertainty by filtering, such as averaging. In subsequent figures, the location of a client terminal as determined based on a TA from a single base station may be illustrated as a circle instead of a circular band with uncertainty. It is to be understood that multiple TA measurements may be taken to reduce the uncertainty.

In some scenarios, it may be useful for a client terminal to know the location of one or more base stations in a wireless communication network. For example, a client terminal may make decisions about whether to make cell reselection and/or handover related measurements and system information decoding as well as how frequently to look for neighboring base stations based on the location information of the base stations.

While a network may know its location accurately, it may not provide that information to a client terminal. Furthermore, the location information for a base station may be required before a client terminal can communicate with a particular base station.

SUMMARY

A method and apparatus are disclosed that enable a client terminal that is capable of determining its own location to be able to determine the location of any base station in a wireless communication network. A client terminal may use the base station location information for improved performance, improved user experience, and reduced power consumption.

In accordance with an aspect of the present disclosure, a method for location determination in a wireless communication system may include: controlling, by a processing device, at a client device, storing location information including longitude and latitude co-ordinates and optional timing advance (TA) information for a first set of points of the client device, in which the first set of points are within a coverage area of a first base station, and in which the location information and the optional TA information for the first set of points are stored with an indication of association with the first base station; when three different first points of the first set are determined to be non-collinear, and the TA information thereof is stored, determining a location of the first base station by a trilateration process using the location information and the TA information of the three different first points; and associating a Cell Identity (CID) of the first base station with the location of the first base station.

In one alternative, the method may include controlling, by the processing device, determining TA information for a given point in the first set based on a plurality of TA measurements for the given point.

In one alternative, the method may include controlling, by the processing device, when a determination is three given points of the first set are collinear based on the location information thereof, continuing to store location information for at least one additional point of the client device as a point in the first set, until a determination is three other given points of the first set are non-collinear.

In one alternative, the method may include controlling, by the processing device, associating at least one of frequency, Public Land Mobile Network identity (PLMN ID) or Closed Subscriber Group identity (CSG ID) with the location of first base station.

In one alternative, the method may include controlling, by the processing device, when three second points in the first set are different from the three different points and the three second points are non-collinear, determining a second location of the first base station by the trilateration process using the location information and the TA information of the three second points.

In one alternative, the method may include controlling, by the processing device, for each set of three given points in the first set which is different from another set of three points in the first set from which a location of the first base station is determined using the location information thereof, determining a second location of the first base station by the trilateration process using the location information and, when available, the TA information of the set of the three given points; and filtering the second locations and the location to obtain a third location of the first base station.

In one alternative, the first base station may be a new serving base station of the client device following reselection or handover from another serving base station of the client device.

In one alternative, when at least four different second points of the first set which include the three different first points are non-collinear, the location of the first base station may be determined in three dimensions by the trilateration process using the location information and, when available, the TA information for the at least four different second points.

In one alternative, the method may include controlling, by the processing device, when the client device is located in a given coverage area of a given base station among second base stations for which second locations have been determined, determining a measurement for cell reselection or handover based on the second locations of the second base stations, wherein the second locations are determined by the trilateration process using location information and TA information of three different second points of the client device respectively within coverage areas of the second base stations.

In one alternative, the method may include controlling, by the processing device, when the TA information is not available for the first set, determining a distance of the client device from the first base station using path loss information obtained from Received Signal Strength Indicator (RSSI) information from the first base station; and determining the location of the first base station using the distance and the location information of the three different first points.

In one alternative, the method may include controlling, by the processing device, determining a location of a neighbor base station using a second distance from the client device to the neighbor base station determined using second path loss information obtained from second RSSI information from the neighbor base station.

In one alternative, the distance may be determined based on at least one of the TA information, uplink transmit power level, timing information broadcast by the first base station or delay relative to an internal time of the client device.

In one alternative, the internal time may be based on information from a Global Positioning Satellite (GPS) receiver of the client device.

In one alternative, the client device may be at the three different first points at different first and second times, and wherein the client device is at a point external to the coverage area of the first base station at a third time between the first and second times.

In one alternative, a distance between second and third points of any given pair of the three different first points may be a predetermined minimum distance.

In one alternative, the predetermined minimum distance may be experimentally determined and set at the client device.

In one alternative, the predetermined minimum distance may be determined dynamically at the client device based on a receive signal metric estimated for the first base station at a plurality of given points of the first set.

In one alternative, the receive signal metric may be a Received Signal Strength Indicator.

In one alternative, the method may include controlling, by the processing device, when a second point of the three different first points is within coverages areas respectively of second and third base stations, controlling, by the processing device, determining second and third locations respectively of the second and third base stations by the trilateration process using the location of the second point.

In one alternative, the first base station may be a serving base station of the client device, and the method may further include controlling, by the processing device, when a second point of the three different first points is within a coverage area respectively of at least one neighbor base station, determining a location of each of the at least one neighbor base station by the trilateration process using the location information of the second point.

In one alternative, the first base station may be a serving base station of the client device, and the method may further include controlling, by the processing device, when a second point of the three different first points is within coverages areas respectively of neighbor base stations, determining a second location of only at least one selected neighbor base station of the neighbor base stations by the trilateration process using the location information of the second point.

In one alternative, the at least one selected neighbor base station may be determined based on a receive signal metric estimated for a given base station among the neighbor base stations.

In one alternative, the at least one selected neighbor base station may be determined based on a Received Signal Strength Indicator (RSSI) value thereof being greater than an RSSI threshold.

In one alternative, the at least one selected neighbor station may have the RSSI value other than less than or equal to the RSSI threshold.

In one alternative, the RSSI threshold may be determined experimentally.

In one alternative, the RSSI threshold may be set according to a network configuration of the wireless communication system.

In one alternative, the at least one selected neighbor base station may be determined based on at least one of frequency, Public Land Mobile Network identity (PLMN ID) or Closed Subscriber Group identity (CSG ID).

In one alternative, the method may include controlling, by the processing device, storing the location information of the second point with an indication of association with each of the at least one selected neighbor base station.

In one alternative, the method may include controlling, by the processing device, storing the location information of the second point with a respective (CID) Cell Identity information for each of the at least one selected neighbor base station.

In one alternative, the method may include controlling, by the processing device, storing at least one of a frequency, Public Land Mobile Network identity (PLMN ID) or Closed Subscriber Group identity (CSG ID) of each of the at least one selected neighbor base station associated with the second location and Cell Identity (CID) information respectively of the at least one selected neighbor base station.

In one alternative, the method may include controlling, by the processing device, storing, for each of the at least one neighbor base station, at least one of TA information, uplink transmit power level, timing information broadcast by the neighbor base station or delay relative to an internal time of the client device.

In one alternative, the internal time may be based on information from a Global Positioning Satellite (GPS) receiver of the client device.

In one alternative, the method may include controlling, by the processing device, storing, in a list, location detail information for N base stations of serving base stations most recently visited by the client device and neighbor base stations most recently detected by the client device.

In one alternative, the number N may be determined by at least one of simulation or experiment and is according to a network configuration of the wireless communication system.

In one alternative, the method may include controlling, by the processing device, storing a time stamp or maintaining a counter for each of the N base stations.

In one alternative, the time stamp or the counter for each of the N base stations may be based on an internal time of the client device.

In one alternative, the internal time may be based on a Global Positioning Satellite (GPS) receiver of the client device.

In one alternative, the method may include controlling, by the processing device, updating the time stamp or the counter for a given base station of the N base stations when the given base station is a serving base station recently visited or neighbor base station recently detected by the client device.

In one alternative, the method may include controlling, by the processing device, when a new base station other than one of the N base stations is a serving base station recently visited by the client device or a neighbor base station recently detected by the client device, replacing in the list the location detail information of a base station of the N base stations which is an oldest base station of the N base stations based on the counter or time stamp thereof, with location detail information of the new base station.

In accordance with an aspect of the present disclosure, an apparatus for location determination in a wireless communication system may include circuitry configured to control, at a client device, storing location information including longitude and latitude co-ordinates and optional timing advance (TA) information for a first set of points of the client device, in which the first set of points are within a coverage area of a first base station, and in which the location information and the optional TA information for the first set of points are stored with an indication of association with the first base station; when three different first points of the first set are determined to be non-collinear, and the TA information thereof is stored, determining a location of the first base station by a trilateration process using the location information and the TA information of the three different first points; and associating a Cell Identity (CID) of the first base station with the location of the first base station.

In accordance with an aspect of the present disclosure, a wireless communication device may include a receiver to receive a wireless communication; and a processing device configured for location determination in a wireless communication system, wherein the processing device is configured to control: storing location information including longitude and latitude co-ordinates and optional timing advance (TA) information for a first set of points of the wireless communication device, in which the first set of points are within a coverage area of a first base station, and in which the location information and the optional TA information for the first set of points are stored with an indication of association with the first base station; when three different first points of the first set are determined to be non-collinear, and the TA information thereof is stored, determining a location of the first base station by a trilateration process using the location information and the TA information of the three different first points; and associating a Cell Identity (CID) of the first base station with the location of the first base station.

DETAILED DESCRIPTION

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

According to an aspect of the present disclosure, a client terminal performs its own location determination for at least three different points referred to as $P_1$, $P_2$ and $P_3$ within the coverage area of the same base station. For each location, it may save the longitude and latitude co-ordinates (x, y) and the TA (t) information for the current serving cell. Let the location and TA information for points $P_1$, $P_2$, and $P_3$ be denoted by pairs $(x_1, y_1, t_1)$, $(x_2, y_2, t_2)$, and $(x_3, y_3, t_3)$. According to an aspect of the present disclosure, the client terminal may use the saved location and TA information only if the three points are located in the coverage area of the same cell. According to an aspect of the present disclosure, the client terminal may make multiple TA measurements for the same location to reduce uncertainty in the estimated distance using the TA information. According to an aspect of the present disclosure, the client terminal checks whether the three points are collinear, i.e., check whether the three points lie on the same straight line. If the three points are collinear, it may continue to make additional measurements until it finds total of three non-collinear points.

According to an aspect of the present disclosure, after obtaining the location and TA information for three non-collinear points served by the same base station, the client terminal may perform location determination for the base station using conventional trilateration methods. According to the aspect of the present disclosure, the client terminal may associate the CID of the cell with the location of the base station determined using the three points and trilateration method. According to another aspect of the present disclosure, the client terminal may associate one or more of the cell parameters such as frequency, PLMN ID, CSG ID, etc. with the location of the base station determined using the three points and trilateration method.

According to an aspect of the present disclosure, the client terminal may continue to make measurements and save the location and TA information for additional points in the same cell. Whenever, it has a set of three points that is different from the already used set of three points, it may make a new location estimate for the currently serving base station. According to an aspect of the present disclosure, the client terminal may perform filtering, for example averaging, of multiple location estimates obtained from different sets of three points for the serving cell to obtain a more accurate estimate of the serving base station location.

According to an aspect of the present disclosure, when a client terminal performs cell reselection or handover to another cell, it may perform the same procedure for the new serving cell. In this manner, a client terminal may continue to estimate and refine the location estimate for all the cells it gets service from.

According to an aspect of the present disclosure, a client terminal may use more than three points with location and TA information for determining location in three dimensions. The same trilateration methods may be extended to three dimensional location determination.

According to an aspect of the present disclosure, a client terminal may use the location information of the various base stations of a network to make decisions about measurements for cell reselections and handovers when it may approach or enter the coverage area of the same base stations.

In some cases a client terminal may not have the TA information. For example, the TA may be available only when a client terminal is actively engaged in uplink communication. In cases where the TA information may not be available, the client terminal may use the RSSI information. Using the RSSI information a client terminal may estimate the path-loss from base station to the client terminal. According to an aspect of the present disclosure, using the path loss information, a client terminal may estimate its distance from the base station. A client terminal may then determine the location of the base station using its own location information and distance to a base station. According to an aspect of the present disclosure, using the distance estimation based on the RSSI, a client terminal may be able to determine location of serving cell as well as all the neighbor cells that may be detectable by a client terminal from various locations. The COST-231 "Propagation Prediction Models" developed by European Cooperation in Science and Technology (COST). Nov. 11, 1999, incorporated by reference herein, may be used to estimate the distance based on measured path loss.

According to an aspect of the present disclosure, a client terminal may use multiple pieces of information from a base station to determine its distance from the base station. This information may include but not limited to TA, RSSI, uplink transmit power level, timing information broadcast by a base station and its delay relative to a client terminal's internal time, e.g., based on client terminal's GPS receiver.

Figure 6:
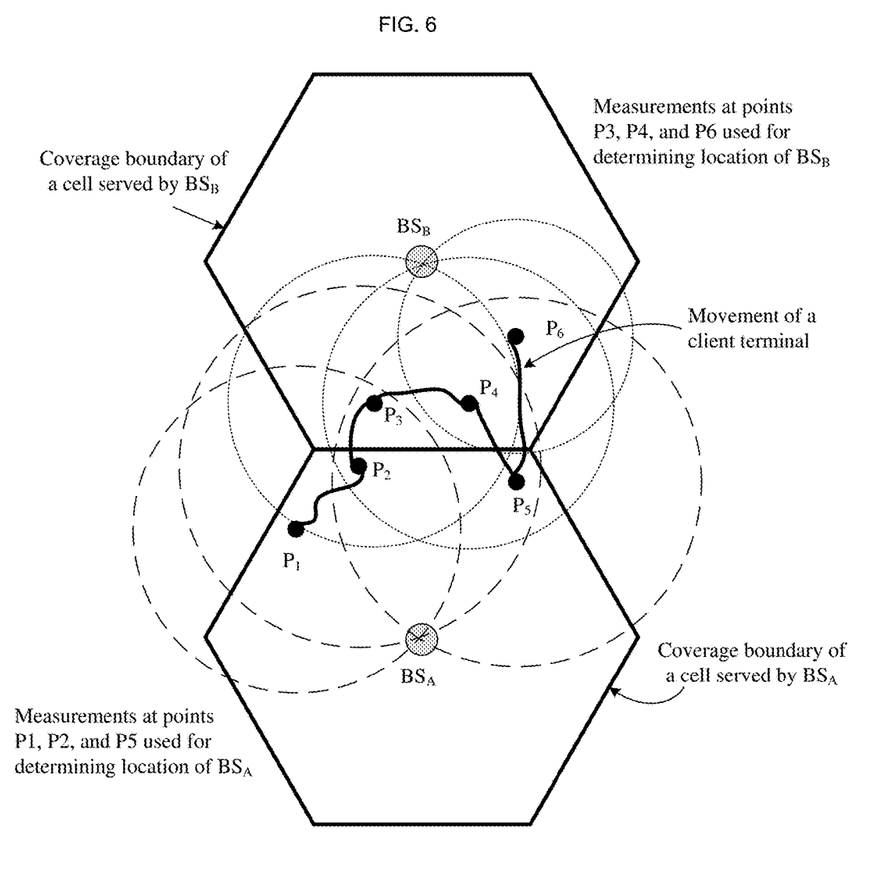
FIG. 6 illustrates an example base station location determination by a client terminal when going back and forth across different cells in a wireless communication system according to the aspects of the present disclosure.

According to an aspect of the present disclosure, the set of points used for location determination need not necessarily be obtained during a single visit to a cell served by a certain base station. For example, as illustrated in FIG. 6, a client terminal may be in two different positions within the coverage area of a serving base station $BS_A$ and it may collect the location and distance information for those two points $P_1$ and $P_2$. Then the client terminal may move away from the base station $BS_A$ and reselect to a neighbor base station $BS_B$. While in the coverage of base station $BS_B$, it may be in various positions and may make location measurements and save the information, for example at points $P_3$ and $P_4$. Eventually, it may return to the coverage of base station $BS_A$ and reselect to it. The client terminal may now be in a different location, such as $P_5$, than its previously saved two points $P_1$ and $P_2$ with location and distance information. The client terminal may now make additional location and distance measurements at $P_5$. Once the client terminal has the required number of points with the measurements, it may perform the location determination for the base station $BS_A$. Eventually, the client terminal may return to base station $BS_B$ and may make location and distance measurements from additional points, such as $P_6$, in the coverage area of base station $BS_B$. Once the client terminal has the required number of points with the measurements, it may perform the location determination for the base station $BS_B$. According to an aspect of the present disclosure, the points at which the client terminal may perform the location determination for a base station may be determined based on certain minimum distance, denoted by $D_t$, between a current point and the previous point where the client terminal performed the location determination for the base station. According to another aspect of the present disclosure, the value of $D_t$ may be determined experimentally and configurable in the client terminal. According to another aspect of the present disclosure, alternatively, the client terminal may dynamically determine the value of $D_t$ and adapt it based on the RSSI or other similar receive signal metric estimated for a base station at different points. The value of the distance $D_t$ may be, for example, 20 meters.

Depending on the various network deployment scenarios, typically in a wireless communication network the client terminal may receive signal from the serving cell and from several neighbor cells in a given location. The neighbor cells may be from the same frequency as that of the serving cell or the neighbor cells may be from different frequency as that of the serving cell. According to another aspect of the present disclosure, the client terminal may perform the location determination for more than one base station at a given location. According to an aspect of the present disclosure, the client terminal may perform location determination for serving base station and all the neighbor base stations from which the client terminal is able to receive the signal in a particular location. According to another aspect of the present disclosure, the client terminal may perform the location determination for only selective neighbor base stations among all the neighbor base stations for which the client terminal is able to receive the signal in a particular location.

According to another aspect of the present disclosure, the client terminal may decide the selective list of neighbor base stations for determining their location in a coverage area based on the RSSI or other similar received signal metric estimated for a base station. According to an aspect of the present disclosure, the client terminal may select the base station with RSSI value greater than an RSSI threshold $T_{RSSI}$ for performing the location determination for the base station. According to an aspect of the present disclosure the client terminal may not perform the location determination for the base station for which the RSSI is less than or equal to $T_{RSSI}$. The value of $T_{RSSI}$ can be determined experimentally and it may be configurable and different for different network deployment scenarios.

According to another aspect of the present disclosure the client terminal may determine the selective list of neighbor base stations for performing location determination in a coverage area based on one or more of the cell parameters such as the frequency, PLMN ID, CSG ID, etc. The client terminal may use other base station properties and/or parameters to determine if the base station may be considered or location determination.

According to another aspect of the present disclosure the client terminal may save and maintain the location information such as the longitude and latitude co-ordinates (x, y) of a point for all the selected neighbor base stations for which it may perform location determination. The client terminal may save and maintain the location information longitude and latitude co-ordinates (x, y) along with the respective CID of all the selected neighbor base stations. Alternatively, the client terminal may save and maintain the CID of all selected neighbor base stations along with their respective longitude and latitude co-ordinates (x, y). Along with the CID, the client terminal may save other parameters of the neighbor base station such as frequency, PLMN ID, CSG ID, etc. According to another aspect of the present disclosure, the client terminal may store and maintain information, including but not limited to, TA, RSSI, uplink transmit power level, timing information broadcast by a base station and its delay relative to a client terminal's internal time, e.g., based on client terminal's GPS receiver for all the selected neighbor base stations for which the client terminal may perform the location determination.

According to another aspect of the present disclosure, the client terminal may create and maintain a list to save the location details for N most recently visited serving base stations and/or detected neighbor base stations. The number N may be determined by simulations and/or experiments and the value may be configurable and may be different for different network scenarios. The client terminal may save the time stamp for each entry in the list or the client terminal may maintain a counter in each entry in the list. The client terminal may use the client terminal's internal time, e.g., based on client terminal's GPS receiver as a time stamp to store or update a list entry. The client terminal may update the time stamp or the counter in a list entry whenever the base station for a particular entry in the list is recently visited or detected by the client terminal. When the client terminal comes across a new base station which is $(N+1)^{th}$ base station then the client terminal may remove the oldest entry in the saved list and may enter the new base station location details in the list.

By way of example only, the above-described method may be implemented in a user device such as a wireless mobile station 100 in FIG. 1.

Figure 7:
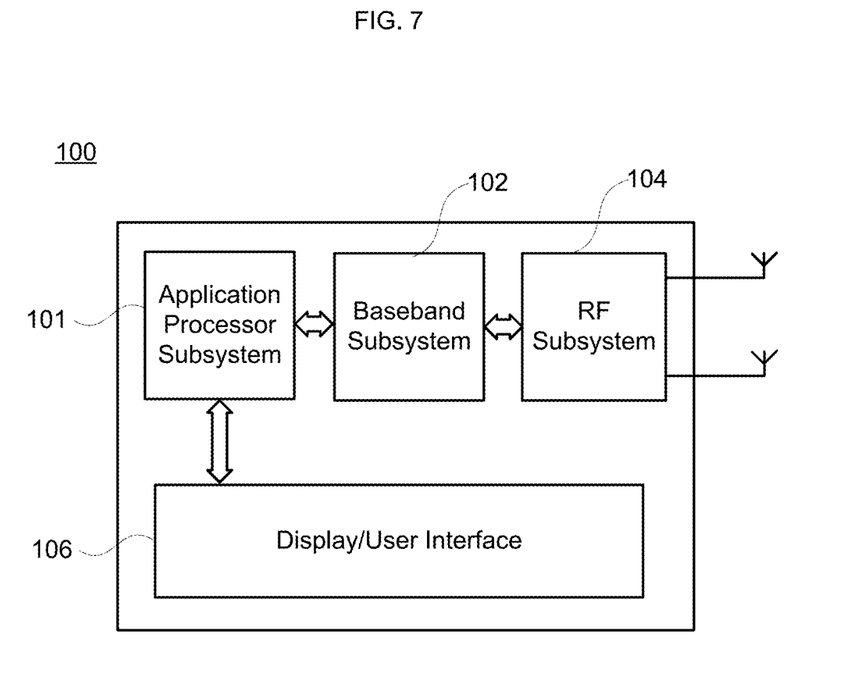
FIG. 7 illustrates a wireless mobile station diagram, which may be employed with aspects of the disclosure described herein.

As shown in FIG. 7, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 8:
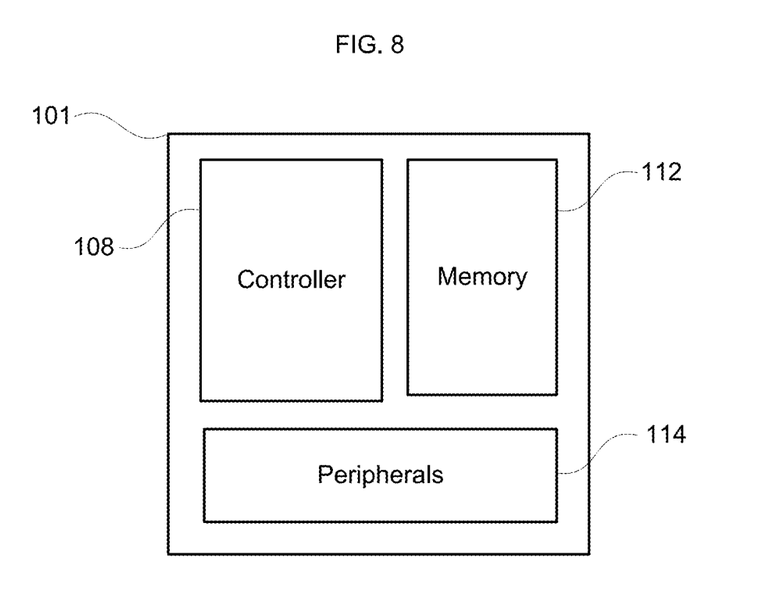
FIG. 8 illustrates an application processor subsystem for a wireless mobile station, which may be employed with aspects of the disclosure described herein.
Figure 9:
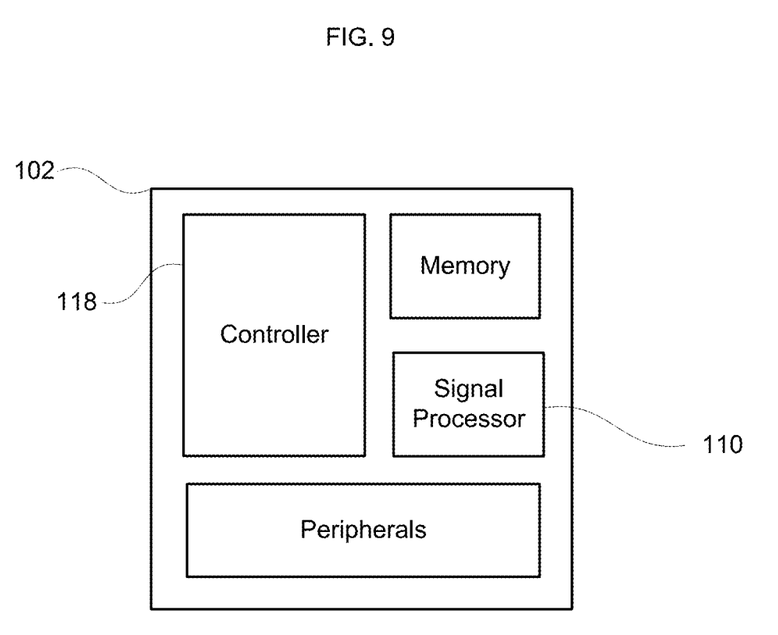
FIG. 9 illustrates a baseband subsystem for a wireless mobile station, which may be employed with aspects of the disclosure described herein.
Figure 10:
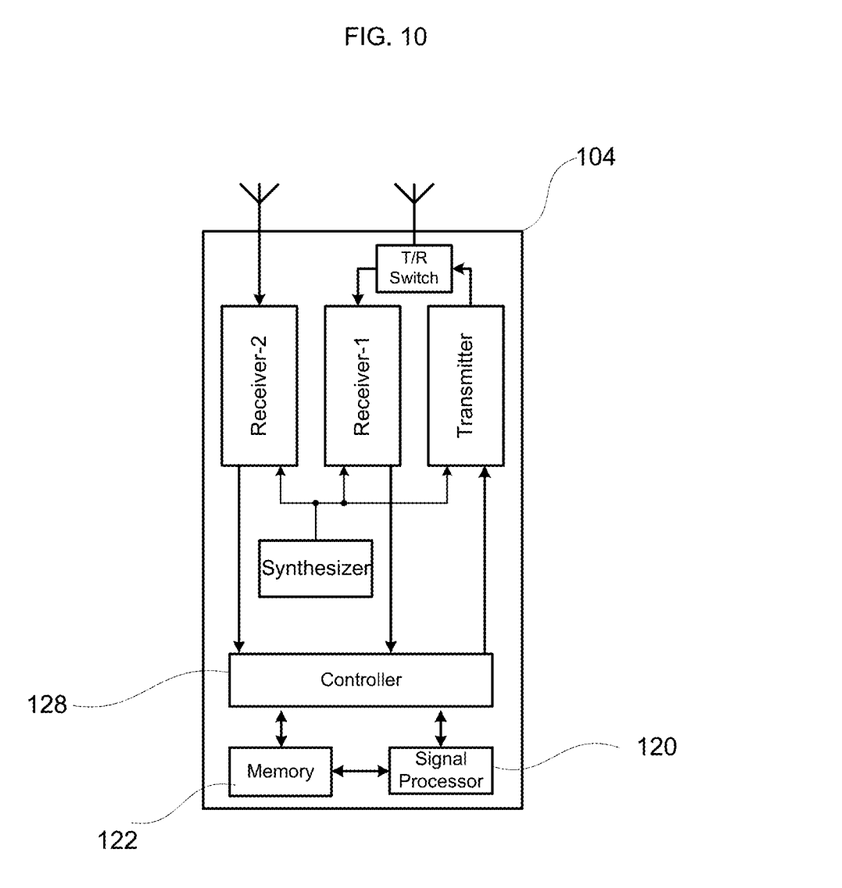
FIG. 10 illustrates a radio frequency (RF) subsystem for a wireless mobile station, which may be employed with aspects of the disclosure described herein.

The application processor subsystem 101 as shown in FIG. 8 may include a controller 108 such as a microcontroller, another processor or other circuitry. The baseband subsystem 102 as shown in FIG. 9 may include a controller 118 such as a microcontroller or other processor. The RF subsystem 104 as shown in FIG. 10 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

In FIG. 8, the Peripherals 114 such as a full or partial keyboard, video or still image display, audio interface, etc. may be employed and managed through the controller 108.

Aspects of the present disclosure may be implemented in firmware of the controller 108 of the application processor in FIG. 8 and/or the controller 118 of the baseband subsystem in FIG. 9. In another alternative, aspects of the present disclosure may also be implemented as a combination of firmware and hardware of the application processor subsystem 101 of FIG. 8 and/or the baseband subsystem 102 of FIG. 9. For instance, a signal processing entity of any or all of the FIG. 9 may be implemented in firmware, hardware and/or software. It may be part of the baseband subsystem, the receiver subsystem or be associated with both subsystems. In one example, the controller 118 and/or the signal processor 110 in FIG. 9 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use this disclosure may include smartphones, tablets, laptops, gaming consoles, cameras, video camcorders, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for location determination in a wireless communication system, the method comprising:
controlling, by a processing device, at a client device,
storing location information including longitude and latitude co-ordinates and optional timing advance (TA) information for a first set of points of the client device, in which the first set of points are within a coverage area of a first base station, and in which the location information and the optional TA information for the first set of points are stored with an indication of association with the first base station;
when three different first points of the first set are determined to be non-collinear, and the TA information thereof is stored, determining a location of the first base station by a trilateration process using the location information and the TA information of the three different first points;
associating a Cell Identity (CID) of the first base station with the location of the first base station;
when the TA information is not available for the first set, determining a distance of the client device from the first base station using path loss information obtained from Received Signal Strength Indicator (RSSI) information from the first base station; and
determining the location of the first base station using the distance and the location information of the three different first points.

2. The method of claim 1, further comprising:
controlling, by the processing device, determining TA information for a given point in the first set based on a plurality of TA measurements for the given point.

3. The method of claim 1, further comprising:
controlling, by the processing device, when a determination is three given points of the first set are collinear based on the location information thereof, continuing to store location information for at least one additional point of the client device as a point in the first set, until a determination is three other given points of the first set are non-collinear.

4. The method of claim 1, further comprising:
controlling, by the processing device, associating at least one of frequency, Public Land Mobile Network identity (PLMN ID) or Closed Subscriber Group identity (CSG ID) with the location of the first base station.

5. The method of claim 1, further comprising:
controlling, by the processing device,
when three second points in the first set are different from the three different points and the three second points are non-collinear, determining a second location of the first base station by the trilateration process using the location information and the TA information of the three second points.

6. The method of claim 1,
controlling, by the processing device,
for each set of three given points in the first set which is different from another set of three points in the first set from which a location of the first base station is determined using the location information thereof, determining a second location of the first base station by the trilateration process using the location information and, when available, the TA information of the set of the three given points; and
filtering the second locations and the location to obtain a third location of the first base station.

7. The method of claim 1, wherein the first base station is a new serving base station of the client device following reselection or handover from another serving base station of the client device.

8. The method of claim 1,
when at least four different second points of the first set which include the three different first points are non-collinear, the location of the first base station is determined in three dimensions by the trilateration process using the location information and, when available, the TA information for the at least four different second points.

9. The method of claim 1, further comprising:
controlling, by the processing device, when the client device is located in a given coverage area of a given base station among second base stations for which second locations have been determined, determining a measurement for cell reselection or handover based on the second locations of the second base stations,
wherein the second locations are determined by the trilateration process using location information and TA information of three different second points of the client device respectively within coverage areas of the second base stations.

10. The method of claim 1, further comprising:
controlling, by the processing device, determining a location of a neighbor base station using a second distance from the client device to the neighbor base station determined using second path loss information obtained from second RSSI information from the neighbor base station.

11. The method of claim 1, wherein the distance is determined based on at least one of the TA information, uplink transmit power level, timing information broadcast by the first base station or delay relative to an internal time of the client device.

12. The method of claim 1, wherein the internal time is based on information from a Global Positioning Satellite (GPS) receiver of the client device.

13. The method of claim 1, wherein the client device is at the three different first points at different first and second times, and wherein the client device is at a point external to the coverage area of the first base station at a third time between the first and second times.

14. The method of claim 1, wherein a distance between second and third points of any given pair of the three different first points is a predetermined minimum distance.

15. The method of claim 14, wherein the predetermined minimum distance is experimentally determined and set at the client device.

16. The method of claim 14, wherein the predetermined minimum distance is determined dynamically at the client device based on a receive signal metric estimated for the first base station at a plurality of given points of the first set.

17. The method of claim 16, wherein the receive signal metric is a RSSI.

18. The method of claim 1, further comprising:
controlling, by the processing device, when a second point of the three different first points is within coverages areas respectively of second and third base stations, controlling, by the processing device, determining second and third locations respectively of the second and third base stations by the trilateration process using the location of the second point.

19. The method of claim 1, wherein the first base station is a serving base station of the client device, and
the method further comprising:
controlling, by the processing device, when a second point of the three different first points is within a coverage area respectively of at least one neighbor base station,
determining a location of each of the at least one neighbor base station by the trilateration process using the location information of the second point.

20. The method of claim 1, wherein the first base station is a serving base station of the client device, and
the method further comprising:
controlling, by the processing device, when a second point of the three different first points is within coverages areas respectively of neighbor base stations,
determining a second location of only at least one selected neighbor base station of the neighbor base stations by the trilateration process using the location information of the second point.

21. The method of claim 20, wherein the at least one selected neighbor base station is determined based on a receive signal metric estimated for a given base station among the neighbor base stations.

22. The method of claim 21, wherein the at least one selected neighbor base station is determined based on a RSSI value thereof being greater than an RSSI threshold.

23. The method of claim 22, wherein the at least one selected neighbor station has the RSSI value other than less than or equal to the RSSI threshold.

24. The method of claim 22, wherein the RSSI threshold is determined experimentally.

25. The method of claim 22, wherein the RSSI threshold is set according to a network configuration of the wireless communication system.

26. The method of claim 20, wherein the at least one selected neighbor base station is determined based on at least one of frequency, Public Land Mobile Network identity (PLMN ID) or Closed Subscriber Group identity (CSG ID).

27. The method of claim 20, further comprising:
controlling, by the processing device, storing the location information of the second point with an indication of association with each of the at least one selected neighbor base station.

28. The method of claim 27, further comprising:
controlling, by the processing device, storing the location information of the second point with a respective (CID) Cell Identity information for each of the at least one selected neighbor base station.

29. The method of claim 20, further comprising:
controlling, by the processing device, storing at least one of a frequency, Public Land Mobile Network identity (PLMN ID) or Closed Subscriber Group identity (CSG ID) of each of the at least one selected neighbor base station associated with the second location and Cell Identity (CID) information respectively of the at least one selected neighbor base station.

30. The method of claim 19, further comprising:
controlling, by the processing device, storing, for each of the at least one neighbor base station, at least one of TA information, uplink transmit power level, timing information broadcast by the neighbor base station or delay relative to an internal time of the client device.

31. The method of claim 30, wherein the internal time is based on information from a Global Positioning Satellite (GPS) receiver of the client device.

32. The method of claim 1, further comprising:
controlling, by the processing device, storing, in a list, location detail information for N base stations of serving base stations most recently visited by the client device and neighbor base stations most recently detected by the client device.

33. The method of claim 32, wherein the number N is determined by at least one of simulation or experiment and is according to a network configuration of the wireless communication system.

34. The method of claim 32, further comprising:
controlling, by the processing device, storing a time stamp or maintaining a counter for each of the N base stations.

35. The method of claim 34, wherein the time stamp or the counter for each of the N base stations is based on an internal time of the client device.

36. The method of claim 35, wherein the internal time is based on a Global Positioning Satellite (GPS) receiver of the client device.

37. The method of claim 34, further comprising:
controlling, by the processing device, updating the time stamp or the counter for a given base station of the N base stations when the given base station is a serving base station recently visited or neighbor base station recently detected by the client device.

38. The method of claim 34, further comprising:
controlling, by the processing device, when a new base station other than one of the N base stations is a serving base station recently visited by the client device or a neighbor base station recently detected by the client device, replacing in the list the location detail information of a base station of the N base stations which is an oldest base station of the N base stations based on the counter or time stamp thereof, with location detail information of the new base station.

39. An apparatus for location determination in a wireless communication system, the apparatus comprising:
circuitry configured to control, at a client device,
storing location information including longitude and latitude co-ordinates and optional timing advance (TA) information for a first set of points of the client device, in which the first set of points are within a coverage area of a first base station, and in which the location information and the optional TA information for the first set of points are stored with an indication of association with the first base station;

when three different first points of the first set are determined to be non-collinear, and the TA information thereof is stored, determining a location of the first base station by a trilateration process using the location information and the TA information of the three different first points;

associating a Cell Identity (CID) of the first base station with the location of the first base station;

when the TA information is not available for the first set, determining a distance of the client device from the first base station using path loss information obtained from Received Signal Strength Indicator (RSSI) information from the first base station; and determining the location of the first base station using the distance and the location information of the three different first points.

40. A wireless communication device comprising:

a receiver to receive a wireless communication; and a processing device configured for location determination in a wireless communication system, wherein the processing device is configured to control:
storing location information including longitude and latitude co-ordinates and optional timing advance (TA) information for a first set of points of the wireless communication device, in which the first set of points are within a coverage area of a first base station, and in which the location information and the optional TA information for the first set of points are stored with an indication of association with the first base station;

when three different first points of the first set are determined to be non-collinear, and the TA information thereof is stored, determining a location of the first base station by a trilateration process using the location information and the TA information of the three different first points;

associating a Cell Identity (CID) of the first base station with the location of the first base station;

when the TA information is not available for the first set, determining a distance of the wireless communication device from the first base station using path loss information obtained from Received Signal Strength Indicator (RSSI) information from the first base station; and determining the location of the first base station using the distance and the location information of the three different first points.

* * * * *